United States Patent
Watanabe (10) Patent No.: US 7,783,890 B2
(45) Date of Patent: Aug. 24, 2010

(54) MULTIMEDIA RECORDING APPARATUS, OBJECT-SPECIFYING INFORMATION PROVIDING APPARATUS, SERVER APPARATUS, VERIFICATION APPARATUS, MULTIMEDIA RECORDING METHOD, OBJECT-SPECIFYING INFORMATION PROVIDING METHOD, SERVER METHOD, VERIFICATION METHOD, AND MULTIMEDIA RECORDING SYSTEM

(75) Inventor: Yoshikazu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1126 days.

(21) Appl. No.: 11/223,941

(22) Filed: Sep. 13, 2005

(65) Prior Publication Data

US 2006/0059201 A1    Mar. 16, 2006

(30) Foreign Application Priority Data

Sep. 14, 2004    (JP)    .............................. 2004-267596

(51) Int. Cl.
*H04L 9/32* (2006.01)

(52) U.S. Cl. .................................................... 713/181
(58) Field of Classification Search .................. 713/181
See application file for complete search history.

(56) References Cited

U.S. PATENT DOCUMENTS

| | | | | |
|---|---|---|---|---|
| 5,982,898 A | * | 11/1999 | Hsu et al. | .................... 713/156 |
| 6,601,172 B1 | * | 7/2003 | Epstein | ........................ 713/178 |
| 6,996,251 B2 | * | 2/2006 | Malone et al. | .............. 382/100 |
| 2002/0023220 A1 | | 2/2002 | Kaplan | |
| 2002/0095586 A1 | | 7/2002 | Doyle et al. | |
| 2005/0081035 A1 | * | 4/2005 | Togawa | ....................... 713/171 |
| 2005/0180566 A1 | * | 8/2005 | Ryal | ............................ 380/57 |

FOREIGN PATENT DOCUMENTS

| | | |
|---|---|---|
| JP | 10-106149 | 4/1998 |
| JP | 11-220686 | 8/1999 |
| JP | 2000-125237 | 4/2000 |
| JP | 2000-261751 | 9/2000 |
| JP | 2000-299847 | 10/2000 |
| JP | 2000-350077 | 12/2000 |
| JP | 2000-354181 | 12/2000 |
| JP | 2001-14277 | 1/2001 |
| JP | 2001-223735 | 8/2001 |

(Continued)

*Primary Examiner*—Kambiz Zand
*Assistant Examiner*—Jason K Gee
(74) *Attorney, Agent, or Firm*—Oblon, Spivak, McClelland, Maier & Neustadt, L.L.P.

(57) ABSTRACT

A multimedia recording system verifies whether or not multimedia data created from an object belongs to the intended object, and has a multimedia recording apparatus which acquires object-specifying information specifying the object, creates first digest data from the multimedia data and creates authentication data by encrypting the first digest data with the object-specifying information, and records the authentication data, a server apparatus which decrypts the authentication data by using the object-specifying information previously registered on the server apparatus to create second digest data, compares the second digest data with the first digest data of the multimedia recording apparatus, and outputs a result of comparison of the first digest data and the second digest data as comparison data, and a verification apparatus which displays a result of verification of whether or not the multimedia data created from the object belongs to the intended object based on the comparison data sent from the server apparatus.

11 Claims, 8 Drawing Sheets

FOREIGN PATENT DOCUMENTS

| | | |
|---|---|---|
| JP | 2002-158914 | 5/2002 |
| JP | 2003-250120 | 9/2003 |
| JP | 2003-274270 | 9/2003 |
| JP | 2003-304228 | 10/2003 |
| JP | 2004-32553 | 1/2004 |
| JP | 2004-40204 | 2/2004 |
| JP | 2004-40307 | 2/2004 |
| JP | 2004-104534 | 4/2004 |
| JP | 2004-112549 | 4/2004 |
| JP | 2004-260768 | 9/2004 |
| JP | 2004-336170 | 11/2004 |
| JP | 2005-73119 | 3/2005 |

\* cited by examiner

| CLASSIFI-CATION | NAME OF TAG | FIELD NAME | NO. OF TAG Dec | NO. OF TAG Hex | TYPE | COUNT |
|---|---|---|---|---|---|---|
| A. TAG RELATED TO VERSION | | | | | | |
| | Exif VERSION | Exif Version | 36864 | 9000 | UNDEFINED | 4 |
| | CORRESPONDING Flashpix VERSION | Flashpix Version | 40960 | A000 | UNDEFINED | 4 |
| B. TAG RELATED TO CHARACTERISTIC OF IMAGE DATA | | | | | | |
| | COLOR SPACE INFORMATION | Color Space | 40961 | A001 | SHORT | 1 |
| C. TAG RELATED TO STRUCTURE | | | | | | |
| | MEANING OF EACH COMPONENT | ComponentsConfiguration | 37121 | 9101 | UNDEFINED | 4 |
| | IMAGE COMPRESSION MODE | CompressedBitsPerPixel | 37122 | 9102 | RATIONAL | 1 |
| | VALID IMAGE WIDTH | PixelXDimension | 40962 | A002 | SHORT OR LONG | 1 |
| | VALID IMAGE HEIGHT | PixelYDimension | 40963 | A003 | SHORT OR LONG | 1 |
| D. TAG RELATED TO USER INFORMATION | | | | | | |
| | MAKERNOTE | MakerNote | 37500 | 927C | UNDEFINED | ANY |
| | USER COMMENT | UserComment | 37510 | 9286 | UNDEFINED | ANY |
| E. TAG RELATED TO RELATED-FILE INFORMATION | | | | | | |
| | RELATED SOUND FILE | RelatedSoundFile | 40964 | A004 | ASCII | 13 |

FIG. 5B

| F. TAG RELATED TO DATE AND TIME | | | | |
|---|---|---|---|---|
| | DATE AND TIME OF CREATION OF ORIGINAL IMAGE DATA | DateTimeOriginal | 36867 | 9003 | ASCII | 20 |
| | DATE AND TIME OF GENERATION OF DIGITAL DATA | DateTimeDigitized | 36868 | 9004 | ASCII | 20 |
| | SUBSEC OF DateTime | SubSecTime | 37520 | 9290 | ASCII | ANY |
| | SUBSEC OF DateTimeOriginal | SubSecTimeOriginal | 37521 | 9291 | ASCII | ANY |
| | SUBSEC OF DateTimeDigitized | SubSecTimeDigitized | 37522 | 9292 | ASCII | ANY |
| G. TAG RELATED TO PHOTOGRAPHING CONDITION | | | | |
| H. OTHER TAG | | | | |
| | IMAGE UNIQUE ID | ImageUniqueID | 42016 | A420 | ASCII | 33 |

MULTIMEDIA RECORDING APPARATUS, OBJECT-SPECIFYING INFORMATION PROVIDING APPARATUS, SERVER APPARATUS, VERIFICATION APPARATUS, MULTIMEDIA RECORDING METHOD, OBJECT-SPECIFYING INFORMATION PROVIDING METHOD, SERVER METHOD, VERIFICATION METHOD, AND MULTIMEDIA RECORDING SYSTEM

BACKGROUND

The present invention relates to a multimedia recording system for recording multimedia data created from an object. More particularly, the present invention relates to a multimedia recording system capable of verifying whether or not the multimedia data created from the object belongs to the intended object.

There has been generally known a multimedia recording system which downloads multimedia data sent from devices, capturing various multimedia data such as a digital camera, into a personal computer for example to record the captured multimedia data.

Since processing or falsification of digital data is easy, there are growing needs for an authentication of the data in the multimedia recording system. Already, there has been proposed a digital camera which applies an electronic signature to data of a photographed image so as to authenticate that the image has not been falsified, or the image has been taken by a particular camera.

For example, JP H11-220686A discloses a technology wherein, when a shutter button is pressed, a CPU (central processing unit) acquires the time from a timer, stores the acquired time to a RAM (random access memory) and simultaneously obtains data of a photographed image from a CCD (charge-coupled device) to accommodate the obtained image data in the RAM, and compresses the accommodated image data. Then, the CPU retrieves a sequence number from an EEPROM (electrically erasable programmable read-only memory), adds 1 (one) to the retrieved sequence number, records the sequence number to which 1 is added to the retrieved sequence number on the EEPROM, and adds the sequence number and data on the time to the top of the compressed image data. The CPU further calculates a message digest function with respect to thus obtained image information by utilizing a massage digest function algorism, retrieves a private key from the EEPROM, encrypts the message digest function, adds an obtained signature to the end of the image information to define a set of photographing information, and records the photographing information on an external memory.

JP 2000-125237A discloses a technology of a digital camera which stores a signal of a photographed image digitally. According to the disclosed technology, a mode dial is set to a registration position, and under control of a CPU, a password is entered based on a selection of desired characters by sequentially changing a character displayed on a display device, one by one, with an arrow button. Then, the CPU inputs the password into a data memory. When a photographing button is pressed in the state in which the password is inputted in the data memory, the image signal from an imaging unit is transmitted to an A/D (analog/digital) converter and is digitalized to be image data. Thereafter, the image data is associated with the inputted password, and is stored into the data memory together with the password.

Also, JP 2000-299847A proposes a technology wherein a digital camera sends information endemic to own to a host computer, and the host computer generates a cryptography key based on the received endemic information, and sends the created cryptography key to the digital camera. The digital camera then encrypts data of a photographed image based on the received cryptography key.

However, in the conventional multimedia recording systems, it is not possible to verify validity of a photographic object. In other words, the conventional multimedia recording systems cannot verify whether or not the photographed contents belong to the intended photographic object.

SUMMARY

Therefore, the present invention has been made in view of the above circumstances, and at least one objective of the present invention is to provide a multimedia recording system capable of verifying whether or not multimedia data created from an object belongs to the intended object.

To achieve these and other advantages and in accordance with the purpose of the invention, as embodied and broadly described herein, the invention provides a multimedia recording apparatus. The multimedia recording apparatus is used for a system which verifies whether or not multimedia data created from an object belongs to the intended object, and introduces the multimedia data from the object and records the multimedia data. The multimedia recording apparatus comprises: a wireless reading device configured to acquire object-specifying information which specifies the object; a system controller configured to create digest data from the multimedia data and create authentication data by encrypting the digest data with the object-specifying information; and a recording device configured to record the authentication data.

The present invention also provides an object-specifying information providing apparatus. The object-specifying information providing apparatus is used for the system which verifies whether or not the multimedia data created from the object belongs to the intended object, and provides the object-specifying information to the above-described multimedia recording apparatus, wherein the object-specifying information providing apparatus comprises a key-pair creating unit configured to create a pair of key data based on a public key cryptosystem, and provides one of the key data to the multimedia recording apparatus as the object-specifying information.

In addition, the present invention provides a server apparatus used for a system which verifies whether or not multimedia data created from an object belongs to the intended object. The server apparatus comprises; a server controller configured to create first digest data from authentication data received from a communication network by using object-specifying information previously registered on the server apparatus as a key, compare the first digest data with second digest data received from the communication network, and output a result of the comparison of the first digest data and the second digest data as comparison data.

The present invention provides another server apparatus used for a system which verifies whether or not multimedia data created from an object belongs to the intended object, comprising; a server controller configured to create first digest data from authentication data received from a communication network by using object-specifying information previously registered on the server apparatus as a key, compare the first digest data with second digest data received from the communication network, and output a result of the comparison of the first digest data and the second digest data as comparison data.

The present invention provides another verification apparatus used for the system which verifies whether or not the multimedia data created from the object belongs to the intended object, comprising: a verification apparatus controller configured to create first digest data from authentication data by using the object-specifying information sent from the above-described another server apparatus through the communication network, compare the first digest data with second digest data and output a result of the comparison as comparison data; and a display device configured to display a result of verification of whether or not the multimedia data created from the object belongs to the intended object based on the result of the comparison of the verification apparatus controller.

In addition, the present invention provides a multimedia recording method used for a system which verifies whether or not multimedia data created from an object belongs to the intended object. The multimedia recording method introduces the multimedia data from the object and records the multimedia data. The method comprises: acquiring object-specifying information which specifies the object; creating digest data from the multimedia data; creating authentication data by encrypting the digest data with the object-specifying information; and recording the authentication data.

The present invention further provides an object-specifying information providing method used for the system which verifies whether or not the multimedia data created from the object belongs to the intended object. The object-specifying information providing method provides the object-specifying information to the above-described multimedia recording method, wherein the object-specifying information is one of a pair of key data based on a public key cryptosystem.

The present invention provides a server method used for a system which verifies whether or not multimedia data created from an object belongs to the intended object. The server method comprises: creating first digest data from authentication data received from a communication network by using object-specifying information previously recorded as a key; comparing the first digest data with second digest data received from the communication network; and outputting a result of the comparison of the first digest data and the second digest data as comparison data.

The present invention also provides a verification method used for the system which verifies whether or not the multimedia data created from the object belongs to the intended object. The verification method comprises: displaying a result of verification of whether or not the multimedia data created from the object belongs to the intended object based on the comparison data sent by the above-described server method.

In addition, the present invention provides another server method used for a system which verifies whether or not multimedia data created from an object belongs to the intended object. The server method comprises: retaining date and time information received from a communication network and object-specifying information; searching the retained object-specifying information based on the date and time information received from the communication network; and sending the object-specifying information which corresponds to the date and time information based on a result of search to the communication network.

Also, the present invention provides another verification method used for the system which verifies whether or not the multimedia data created from the object belongs to the intended object, comprising: creating first digest data from authentication data by using the object-specifying information sent by the above-described another server method through the communication network; comparing the first digest data with second digest data; and displaying a result of verification of whether or not the multimedia data created from the object belongs to the intended object based on a result of the comparison.

Moreover, the present invention provides a multimedia recording system which verifies whether or not multimedia data created from an object belongs to the intended object. The multimedia recording system comprises: a multimedia recording apparatus configured to introduce the multimedia data from the object and record the multimedia data; a server apparatus configured to perform predetermined processes according to data received from a communication network; and a verification apparatus connected with the server apparatus through the communication network, wherein the multimedia recording apparatus comprises a wireless reading device configured to acquire object-specifying information which specifies the object, a system controller configured to create first digest data from the multimedia data and create authentication data by encrypting the first digest data with the object-specifying information, and a recording device configured to record the authentication data, the server apparatus comprises a server controller configured to decrypt the authentication data sent from the verification apparatus through the communication network by using the object-specifying information previously registered on the server apparatus as a key to create second digest data, compare the second digest data with the first digest data of the multimedia recording apparatus sent from the verification apparatus through the communication network, and output a result of comparison of the first digest data and the second digest data as comparison data, and the verification apparatus comprises a display device configured to display a result of verification of whether or not the multimedia data created from the object belongs to the intended object based on the comparison data sent from the server apparatus.

The present invention also provides another multimedia recording system which verifies whether or not multimedia data created from an object belongs to the intended object, comprising: a multimedia recording apparatus configured to introduce the multimedia data from the object and record the multimedia data; a server apparatus configured to perform predetermined processes according to data received from a communication network; and a verification apparatus connected with the server apparatus through the communication network, wherein the multimedia recording apparatus comprises a wireless reading device configured to acquire first object-specifying information which specifies the object, a system controller configured to create first digest data from the multimedia data and create authentication data by encrypting the first digest data with the first object-specifying information, and a recording device configured to record the authentication data, the server apparatus comprises a retaining device configured to retain date and time information sent from the verification apparatus through the communication network and second object-specifying information, and a server controller configured to search the second object-specifying information retained in the retaining device based on the date and time information sent from the verification apparatus through the communication network and send the second object-specifying information which corresponds to the date and time information based on a result of search to the verification apparatus through the communication network, and the verification apparatus comprises a verification apparatus controller configured to decrypt the authentication data of the multimedia recording apparatus by using the second object-specifying information sent from the server apparatus through the communication network as a key to create second digest data, and compare the second digest data with the first digest data of the multimedia recording apparatus, and a display device configured to display a result of verification of whether or not the multimedia data created from the object belongs to the intended object based on a result of the comparison of the verification apparatus controller.

Furthermore, the present invention provides a multimedia recording method of a multimedia recording system which verifies whether or not multimedia data created from an object belongs to the intended object. The method comprises: acquiring object-specifying information which specifies the object; creating first digest data from the multimedia data; creating authentication data by encrypting the first digest data with the object-specifying information; recording the authentication data; decrypting the authentication data by using the object-specifying information previously registered as a key to create second digest data; comparing the second digest data with the first digest data; outputting a result of comparison of the first digest data and the second digest data as comparison data, and displaying a result of verification of whether or not the multimedia data created from the object belongs to the intended object based on the comparison data.

In addition, the present invention provides another multimedia recording method of a multimedia recording system which verifies whether or not multimedia data created from an object belongs to the intended object. The method comprises: acquiring first object-specifying information which specifies the object; creating first digest data from the multimedia data; creating authentication data by encrypting the first digest data with the first object-specifying information; recording the authentication data; retaining date and time information and second object-specifying information; searching the retained second object-specifying information based on the date and time information; outputting the second object-specifying information which corresponds to the date and time information based on a result of search; decrypting the authentication data by using the second object-specifying information as a key to create second digest data; comparing the second digest data with the first digest data, and displaying a result of verification of whether or not whether or not the multimedia data created from the object belongs to the intended object based on a result of the comparison.

It is to be understood that both the foregoing general description and the following detailed description are exemplary, and are intended to provide further explanation of the invention as claimed.

The present application is based on and claims priority from Japanese application number 2004-267596, filed Sep. 14, 2004, the disclosure of which is hereby incorporated by reference herein in its entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Hereinafter, an example of a structure of a digital still camera system as a multimedia recording system based on a common key system according to an embodiment of the present invention will be described.

Figure 1:
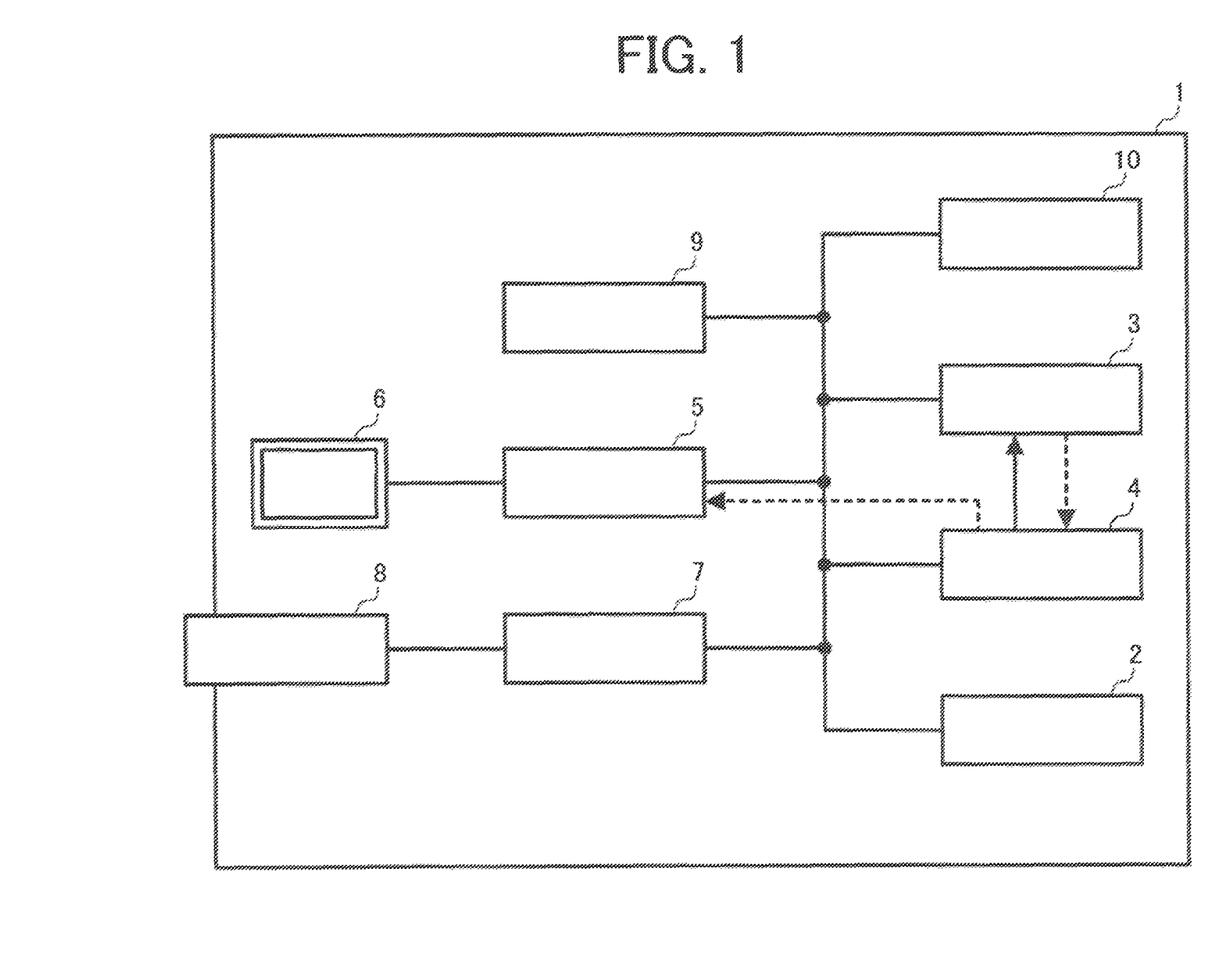
FIG. 1 is a block diagram showing a structure of one embodiment of a digital still camera apparatus used for a digital still camera system according to the present invention.

FIG. 1 is a block diagram showing a structure of one embodiment of a digital still camera apparatus used for the digital still camera system according to the present invention.

Referring to FIG. 1, the digital still camera apparatus (multimedia recording apparatus) 1 comprises a system controller 2, an imaging portion 3, an image processing portion 4, a display control portion 5, an LCD (liquid crystal display) 6, a recording media interface portion 7, a recording media (recording device) 8, a hard-key interface portion 9, and a wireless ID reading portion 10 (wireless reading device).

The system controller 2 comprises a CPU (central processing unit), a flash memory, a SDRAM (synchronous dynamic random access memory), and a timer for example, and controls the entire digital still camera apparatus 1.

The imaging portion 3 comprises optical system parts such as a lens and a lens driving motor, a CCD (charge-coupled device), a CCD driving circuit, and an A/D (analog/digital) converter for example for imaging.

The image processing portion 4 comprises an image processing DSP (digital signal processor), and RAM (random access memory) for example. The image processing portion 4 applies various image processes to a signal of an image obtained by the imaging portion 3, and adjusts timing of driving the CCD included in the imaging portion 3. The imaging processing portion 4 also controls the lens driving motor included in the imaging portion 3 to adjust zooming, focusing and exposure, and compresses and decompresses the image.

The display control portion 5 comprises a D/A (digital/analog) converter and an on-screen display controller for example. The display control portion 5 performs a signal process to display the image signal, to which the various image processes are applied by the image processing portion 4, on the LCD 6. In addition, the display control portion 5 creates a variety of graphic images for a user interface and displays the created graphic image on the LCD 6.

The LCD 6 displays the image and the graphic image for the user interface.

The recording media interface portion 7 comprises a memory card controller, and is provided for interfacing with the recording media 8.

The recording media 8 is, for example but not limited to, a flash memory. The recording media 8 is attachably and detachably provided in the digital still camera apparatus 1 for storing the compressed image signal and various information related to images, etc.

The hard-key interface portion 9 comprises a sub-CPU for example. The hard-key interface portion 9 detects a state of a user interface such as keys and a dial which are not shown, and controls a main power of the CPU (main CPU).

The wireless ID reading portion 10 comprises the hard-key interface portion 9, a controller and an antenna for example. The wireless ID reading portion 10 is provided for reading information on a wireless ID.

Now, description on a normal photographing operation of the digital still camera apparatus 1 will be given below.

Prior to photographing, a user operates the not-shown keys and the dial for example to decide a photographing operation mode (e.g. continuous photographing mode, normal photographing mode). The contents of operation of the user are judged by the system controller 2 through the hard-key interface portion 9. The system controller 2 allows the display control portion 5 to create a guidance-graphic according to the operation of the user, and prompts the user to carry out the next operation.

When the photographing operation mode is decided, the system controller 2 sets processing parameters for the image processing portion 4 according to the selected mode. After preparation for the photographing is made, the system controller 2 activates the imaging portion 3 and the image processing portion 4, and prior to the actual photographing, the imaging portion 3 initiates an imaging operation for displaying a monitoring image according to control of the image processing portion 4.

At this time, data of imaged images are continuously sent to the image processing portion 4. The image processing portion 4 applies processes such as color space conversion, gamma correction and white balance adjustment to the sent image data, and thereafter, sends the image data to the display control portion 5. Simultaneously, the image processing portion 4 detects the exposure and controls the imaging portion 3 to adjust the exposure. The display control portion 5 performs the signal process to the image data and displays the monitoring image on the LCD 6 to present a state of imaging to the user.

Subsequently, when the user presses a not-shown shutter release button halfway (half-press of the shutter release button), such an operation of the user is judged by the system controller 2 through the hard-key interface portion 9 as in the setting of photographing operation modes. The system controller 2 controls the image processing portion 4 to extract an evaluation value for an auto focus (AF) control from the monitoring image, and controls the imaging portion 3 based on a predetermined algorism to adjust focus.

In a case where a zoom button which is not shown is pressed, such an operation is similarly judged by the system controller 2 through the hard-key interface portion 9. The system controller 2 controls and allows the imaging portion 3 to perform a zooming operation in a direction inputted by the user.

When the user presses the not-shown shutter release button fully (full-press of the shutter release button), such an operation is similarly judged by the system controller 2 through the hard-key interface portion 9. The system controller 2 controls the image processing portion 4 according to the set photographing operation mode to initiate a photographing operation.

The imaging portion 3 scans a specified image and sends the scanned image to the image processing portion 4 according to the control of the image processing portion 4. The image processing portion 4 carries out the image process and compression process on the image according to the photographing operation mode, and at this time, the image processing portion 4 also creates reduced image data from the image data, and compresses the image data to generate thumbnail data. In the normal photographing operation mode, the scanning and processing of the image of 1 frame is carried out once, whereas in the continuous photographing mode, the scanning and processing of the image are repeatedly carried out with a predetermined frame rate until depression of the shutter release button is released.

The system controller 2 retrieves the compressed image data and the thumbnail data, adds header information to the retrieved data, and thereafter, writes the data into the recording media 8 through the recording media interface portion 7. The header information includes information on the selected photographing operation mode and information on the date or time of photographing, etc.

A file name of the image is automatically allocated based on, for example, a predetermined character string ("RIMG" etc.) and a sequence number. For example, such a file name is allocated to an image file in which 1 (one) is added to the sequence number of the file name of the file already recorded in the recording media 8 (RIMG343.jpg, RIMG344.jpg, and so on). In a case where there is no file in the recording media 8, the file name will be the predetermined character string and the initial sequence number; i.e. "RIMG001.jpg", for example.

When the system controller 2 writes the data into the recording media 8 through the recording media interface portion 7, file management information in the recording media 8 is simultaneously updated. Accordingly, a series of normal photographing operation is completed.

Next, a structural example of a digital still camera system based on the common key system according to a first embodiment of the present invention will be described.

Figure 2:
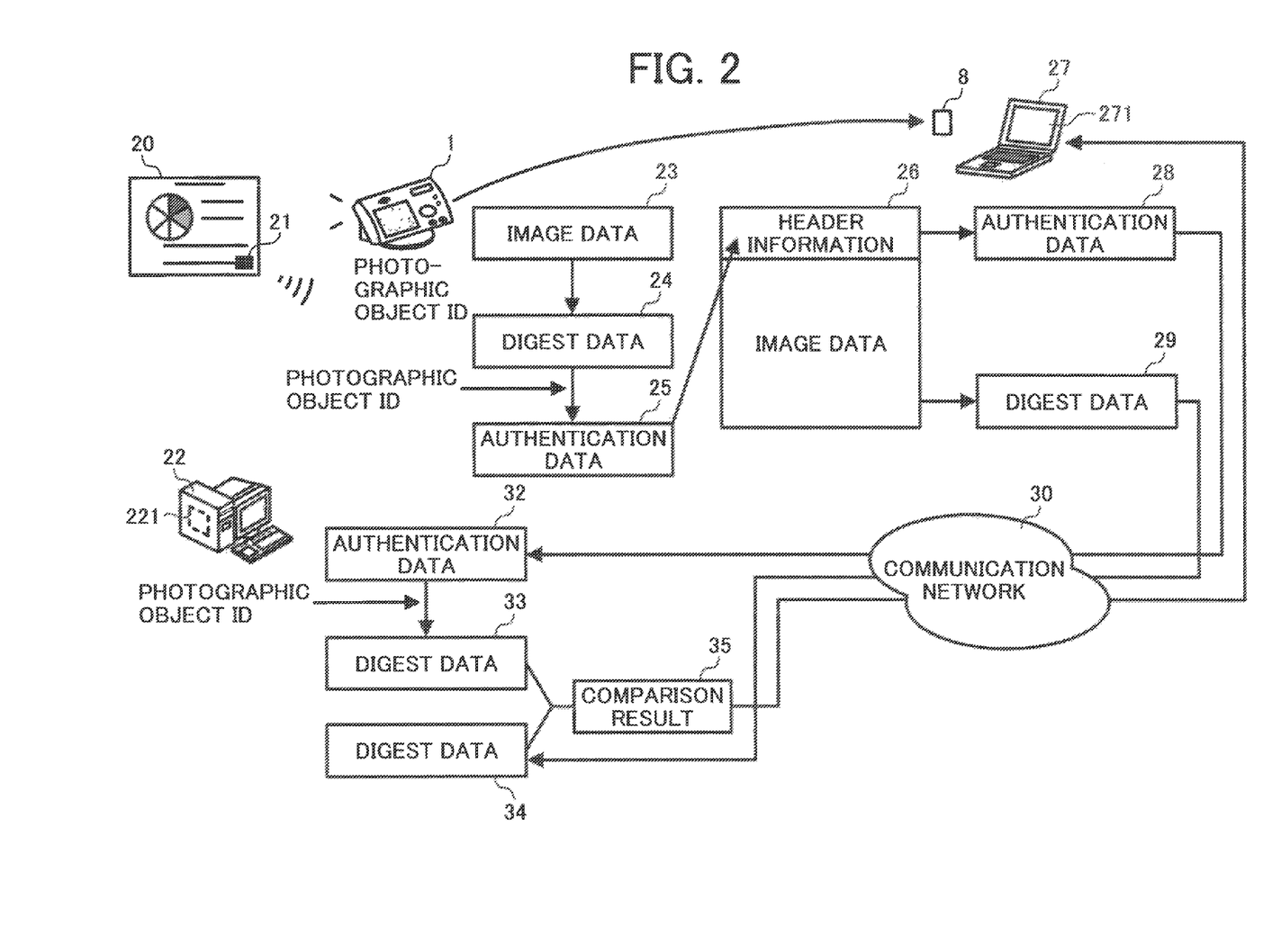
FIG. 2 is an explanatory diagram of a first embodiment of the digital still camera system of the present invention based on a common key system.

FIG. 2 is an explanatory diagram of the structural example of the digital still camera system according to the first embodiment of the present invention based on the common key system.

FIG. 2 shows a photographic object 20 as an object (poster), a wireless ID tag 21 (wireless transmission device) attached to the photographic object 20, and a server apparatus 22 for authenticating an image provided by an informant. The server apparatus 22 has a controller (server controller) 221 and comprises a personal computer having a display device. The controller 221 comprises a CPU, a flash memory, a SDRAM for example, and controls the entire server apparatus 22. FIG. 2 also shows the image data 23 photographed with the digital camera apparatus 1 and to which the image process and the compression process are applied by the image processing portion 4, digest data 24 created from the image data 23 based on a hash function, and authentication data 25 created by encrypting the digest data 24 with a photographic object ID comprising object-specifying information obtained from the wireless ID tag 21. Reference number 26 denotes the image file stored in the recording media 8, and 27 denotes a verification apparatus. The verification apparatus 27 comprises a personal computer having a display device 271 for example, and reproduces the image file and confirms a result of verification (authentication) that the data created from the object 20 belongs to the intended object. Reference number 28 denotes authentication data extracted from the image file 26, and reference number 29 denotes first digest data created from the image data of the image file 26 based on the hash function.

Moreover, FIG. 2 shows a communication network 30 connecting the personal computer 27 and the personal computer 22 such as the internet, authentication data 32 sent from the personal computer 27 to the personal computer 22, second digest data 33 created by decrypting the authentication data 32 with the photographic object ID, first digest data 34 sent from the personal computer 27 to the personal computer 22, and a comparison result 35 as a result of comparison of the second digest data 33 and the first digest data 34.

The skilled artisan will readily appreciate that the object (source) is not limited to the photographic object (poster) 20. The data from the source may also be multimedia data other than a still image, a movie and a sound.

The first embodiment of the present invention is characterized in that it is possible to verify that an image of the photographic object 20 as the photographed object has definitely been taken at a place where the photographing of the photographic object 20 is carried out, and to verify that the image of the photographic object 20 has not been falsified.

Figure 3A:
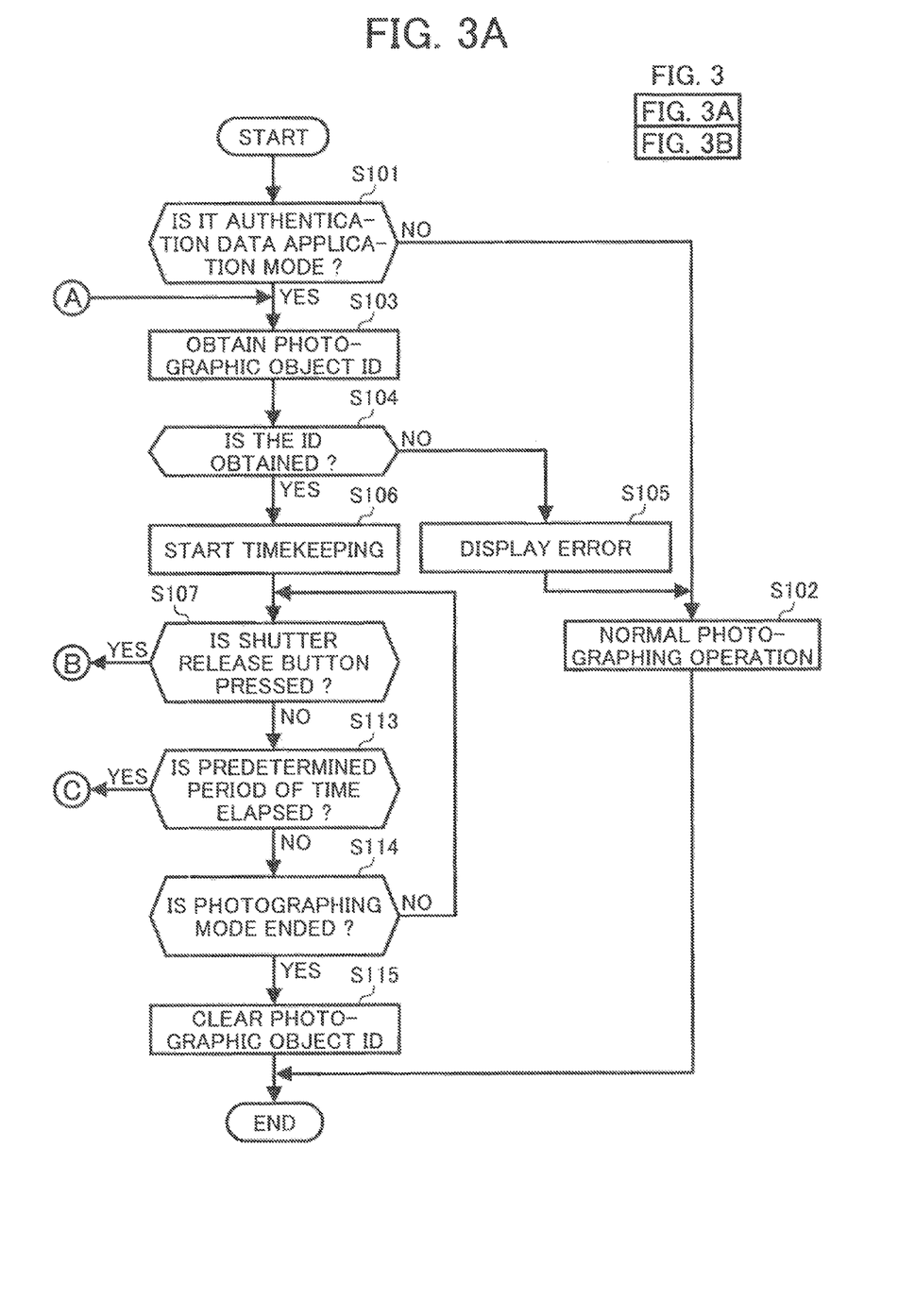
FIG. 3 is a flow chart of an operation in a photographing mode of the digital camera apparatus shown in FIGS. 1 and 2.
Figure 3B:
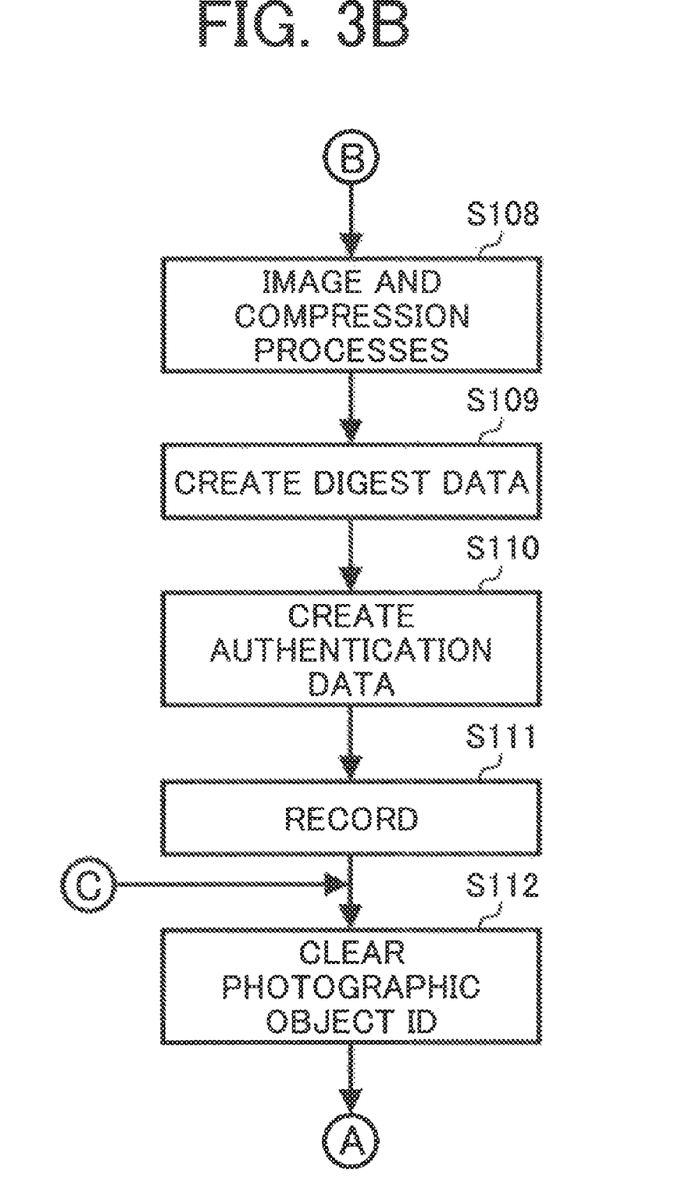

Next, an operation of the digital still camera system according to the first embodiment based on the common key system will be described. FIG. 3 is a flow chart of the operation in the photographing mode of the digital camera apparatus 1 shown in FIGS. 1 and 2.

As shown in FIG. 2, first, the informant previously assigns the ID unique to the photographic object as the object (e.g. the poster expected to be photographed) 20 to the photographic object, writes the assigned photographic object ID into the wireless ID tag 21, and register data on the assigned photographic object ID on the personal computer 22.

Then, a photographer obtains the photographic object ID and photographs the photographic object with the digital still camera apparatus (digital camera) 1 as explained below.

When the user operates the not-shown keys and dial and decides the photographing operation mode (continuous photographing mode, normal photographing mode, etc.) prior to photographing as in the procedure described above to select the photographing mode, the system controller 2 of the digital camera 1 judges whether or not the mode is an authentication data application mode (STEP 101 of FIG. 3). Here, setting of the authentication data application mode is previously selected by the user. When the mode is not the authentication data application mode (NO in STEP 101), an operation of a general mode such as the normal photographing operation described above is carried out (STEP 102).

When the mode is the authentication data application mode (YES in STEP 101), the system controller 2 activates the wireless ID reading portion 10 to read or introduce the photographic object ID (STEP 103). When the photographic object ID cannot be obtained (NO in STEP 104), the guidance informing the user that acquisition of the photographic object ID is failure is displayed on the LCD 6 for example (STEP 105), and the mode shifts to the general mode operation (STEP 102).

When the photographic object ID is obtained, the system controller 2 activates the internal timer to initiate timekeeping (STEP 106). When the shutter release button is pressed (YES in STEP 107), the image process and the compression process similar to the normal photographing operation are carried out (STEP 108), and the digest data 24 is created from the thus created image data 23 as shown in FIG. 2 with the hash function (STEP 109).

Further, the system controller 2 encrypts the digest data 24 by utilizing the photographic object ID comprising the object-specifying information obtained in the STEP 103 as a key to create the authentication data 25 (STEP 110). The created authentication data 25 is embedded in the header information of the image file 26, and the image file 26 is recorded on the recording media 8 (STEP 111). A format of the image file (Exchangeable image file format: Exif 2.2) generally created by the digital camera 1 is as shown in FIG. 4 for example.

Figure 4:
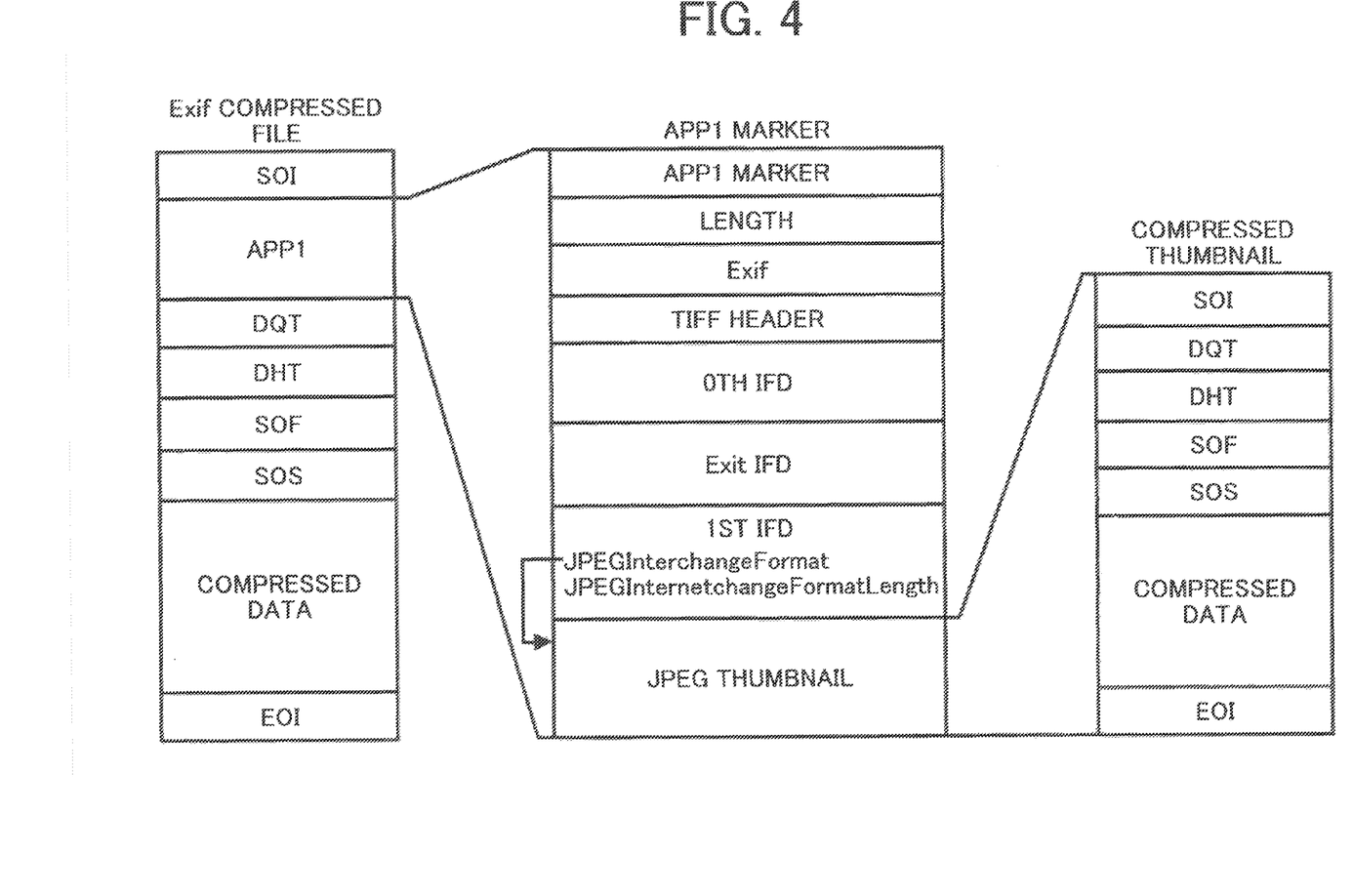
FIG. 4 is an explanatory diagram showing the entire structure of an image file of an image file format generally created by the digital camera apparatus.
Figure 5A:
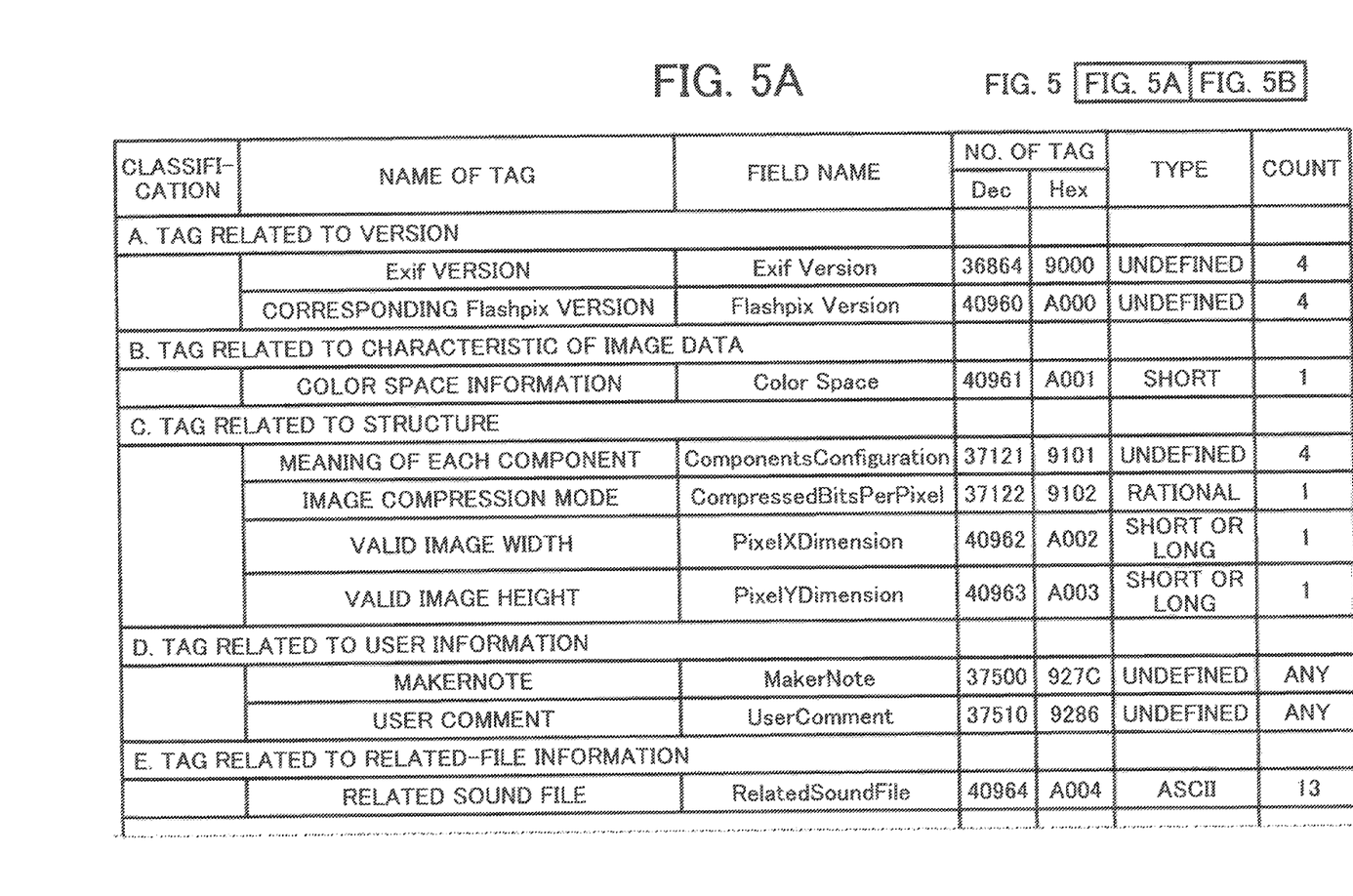
FIG. 5 is an explanatory diagram showing a structure of attachment information of an Exif FD.
Figure 5B:
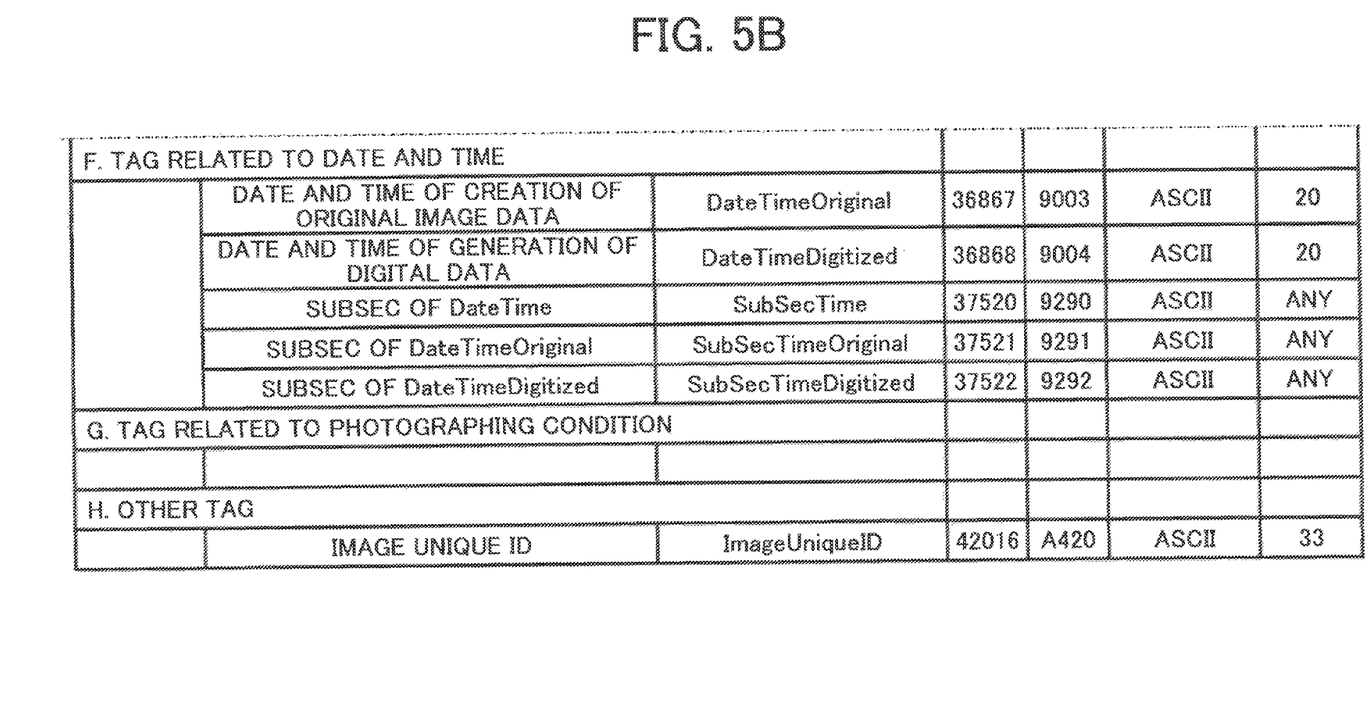

FIG. 4 is an explanatory diagram showing the entire structure of the image file according to the image file format (Exif 2.2) generally created by the digital camera 1. Here, the header information is equivalent to an APP1, and the authentication data is added in a maker note of an Exif FD shown in FIG. 5, which is an explanatory diagram showing the structure of attachment information of the Exif FD.

Turning to FIG. 3, when the recording of a predetermined recording to the recording media 8 is completed, the system controller 2 clears (discards) the data on the photographic object ID retained in the digital camera 1 (STEP 112), and obtains the photographic object ID again. Similarly, the system controller 2 also clears the retained photographic object ID data (STEP 112) in a case where a predetermined period of time has elapsed without the shutter release button being depressed (STEP 113), and obtains the photographic object ID again.

When an end of the photographing mode is instructed by the operation of the user (YES in STEP 114), the system controller 2 similarly clears the retained photographic object ID data (STEP 115), and ends the photographing mode. The operation of a side of the digital camera 1 in the digital still camera system is thereby completed.

Next, the photographer provides the photographed image to a third person by, for example, giving the recording media 8 containing the photographed image to the third person or sending the photographed image to the third person electronically through e-mail or the like if the digital camera 1 has a transmitting function. Hereinafter, an operation of the third person to verify that the image of the photographic object 20 has definitely been taken at the place where the photographing of the image is carried out, and to verify that the image has not been falsified, will be described.

First, as shown in FIG. 2, the third person accesses to the personal computer 22 through the communication network 30 from the personal computer 27 to send the authentication data 28 and the first digest data 29 of the digital camera 1 to the personal computer 22.

The controller 221 of the personal computer 22 creates the second digest data 33 from the authentication data 32 (authentication data 28) sent by the personal computer 27 through the communication network 30 by utilizing the photographic object ID previously registered in the personal computer 22 as a key. The controller 221 of the personal computer 22 compares the created second digest data 33 with the first digest data 34 (first digest data 29) sent from the personal computer 27, and sends the comparison result 35 to the personal computer 27 through the communication network 30.

The controller 221 of the personal computer 22 sends the comparison result 35 to the verification apparatus 22 to the effect that the authentication is successful if the created second digest data 33 and the sent first digest data 34 coincide. On the other hand, the controller 221 of the personal computer 22 sends the comparison result 35 to the verification apparatus 22 to the effect that the photographic object is unauthorized or the image is falsified if the second digest data 33 and the first digest data 34 do not coincide. The verification apparatus 22 displays the comparison result 35 sent from the personal computer 22 on the display 271. Thereby, the verification of whether or not the data created from the object 20 belongs to the intended object 20 is established.

In the present embodiment, although the example of giving the authentication to the photographed still image data has been described, it is to be noted that the contents of data subjected to the authentication is not limited to the still image. It is possible to give the authentication to any contents of data as long as such data is created from some object, and the contents of data may be, for example but not limited to, the movie data, the sound data, etc. In this case, as in the case of giving the authentication to the still image, the authentication data may be added to the identical file as the header information or a footer information, or the authentication data may be recorded as a separate file.

Hereinafter, a structural example of a digital still camera system based on a public key system according to a second embodiment of the present invention will be described.

Figure 6:
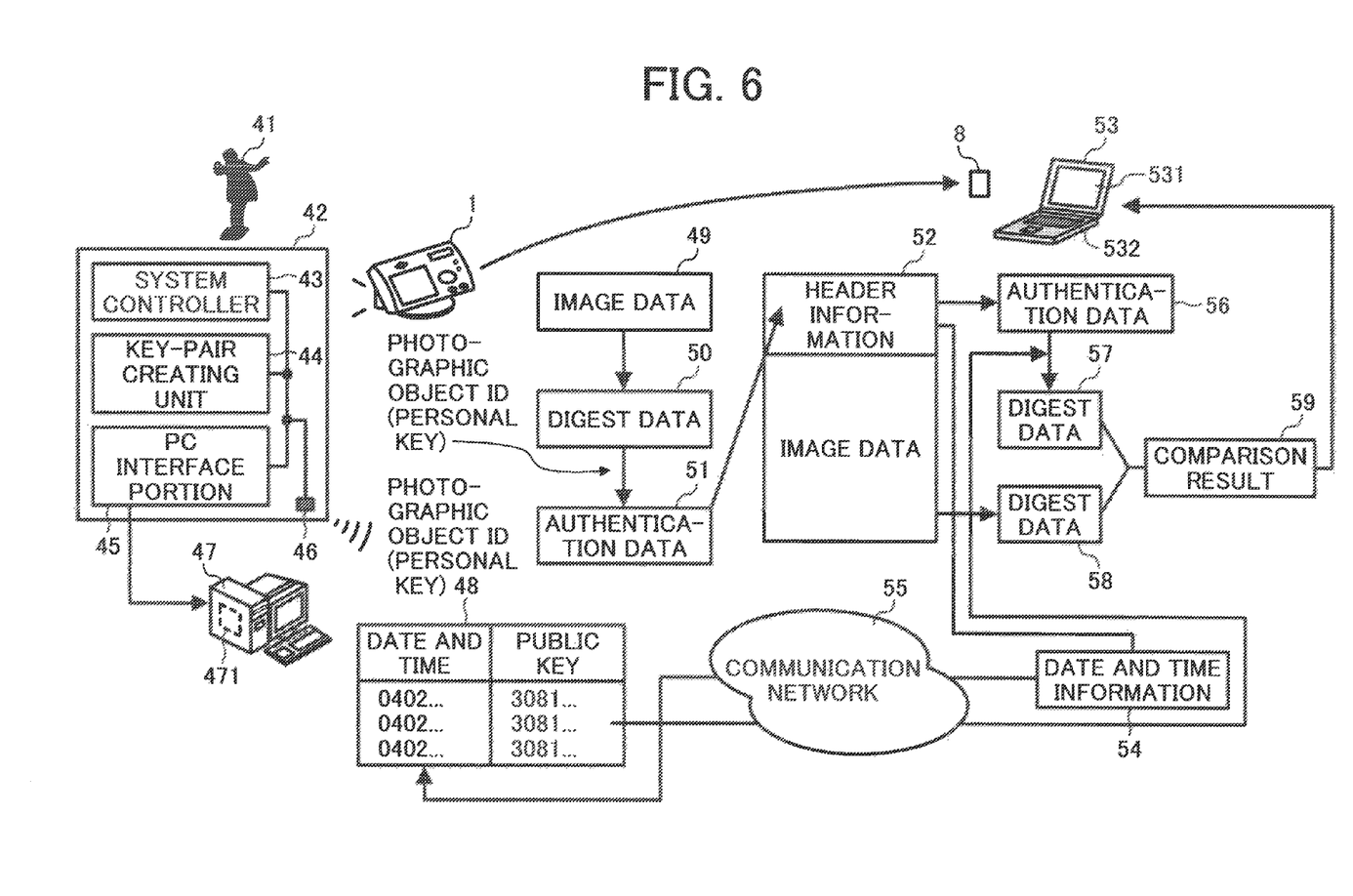
FIG. 6 is an explanatory diagram of a second embodiment of the digital still camera system of the present invention based on a public key system.

FIG. 6 is an explanatory diagram of the structural example of the digital still camera system according to the second embodiment of the present invention based on the public key system.

Referring to FIG. 6, a wireless ID transmission device 42 (wireless transmission device, object-specifying information providing apparatus) is a device for updating the contents of the wireless ID tag which is taken along by a photographic object (person) 41.

A system controller 43 (system control unit) comprises a CPU, a flash memory, a SDRAM and a timer for example, and performs control of the entire wireless ID transmission device 42.

A key-pair creating unit 44 comprises a DSP (digital signal processor) and a RAM for example, and creates a key pair in a public key cryptosystem.

A PC interface portion 45 establishes connection with a personal computer to transmit and receive data between the PC interface portion 45 and the personal computer.

A wireless ID tag portion 46 comprises the wireless ID tag and a controller for rewriting the photographic object ID.

A personal computer 47 is a server apparatus comprising a display device, and has a controller 471 (server controller) and a retaining device 472. The personal computer 47 is provided for publishing public key data.

A public key table 48 is configured to be transmitted from the wireless ID transmission device 42 to the personal computer 47, and is retained in the retaining device 472 of the personal computer 47.

Image data 49 is data of an image photographed by the digital camera apparatus 1 and to which the image process and the compression process are applied by the image processing portion 4.

Digest data 50 is data created from the image data 49 by the hash function.

Authentication data 51 is data created by encrypting the digest data 50 with the photographic object ID comprising the object-specifying information obtained from the wireless ID tag portion 46.

An image file 52 is an image file recorded on the recording media 8.

A personal computer 53 as the verification apparatus comprises a personal computer having a display device 531 for reproducing and verifying or authenticating the image file 52. The personal computer 53 also has a computer controller (verification apparatus controller) 532 which includes a CPU, a flash memory, a SDRAM for example, and controls the entire personal computer 53.

Photographing date and time information 54 is information extracted from the image file 52.

A communication network 55 is a communication network such as the internet or the like for connecting the personal computer 53 and the personal computer 47.

Authentication data 56 is data extracted from the image file 52.

Second digest data 57 is data created by decrypting the authentication data 56 with the public key.

First digest data 58 is data created from the image data of the image file 52 based on the hash function.

A result of comparison 59 is a result of having compared the second digest data 57 with the first digest data 58.

The second embodiment of the present invention is characterized in that it is possible to verify that an image of the photographed person is surely the image of him/her, and to verify that the image has not been falsified.

Next, an operation of the digital still camera system according to the second embodiment based on the public key system will be described.

As shown in FIG. 6, the person targeted as the photographic object takes the wireless ID transmission device 42 along with him/her. The wireless ID transmission device 42 incorporates the wireless ID tag. The contents of the wireless ID tag include key data (personal key) as one of the key pair based on the public key cryptosystem. The wireless ID transmission device regularly rewrites or updates the personal key data (personal key).

In the wireless ID transmission device 42, the system controller 43 carries out timekeeping to activate the key-pair creating portion 44 at predetermined time intervals, so as to create a new key pair. Within the created key pair, the personal key is set in the wireless ID tag portion 46 to rewrite or update the information transmitted from the wireless ID tag.

On the other hand, public key data (public key) as the other one of the key pair is written and updated in the flash memory included in the system controller 43 together with information on the timekeeping. The person as the photographic object irregularly or regularly registers the key data (public key data) stored in the wireless ID transmission device 42 on the personal computer 47. The connection of the wireless ID transmission device 42 and the personal computer 47 is established through the PC interface portion 45, thereby the timekeeping information and the public key data stored in the flash memory included in the system controller 43 are transmitted to the personal computer 47. The personal computer 47 retains the received data of the timekeeping information and the public key data as the public key table 48. The system controller 43 clears the flash memory when the transmission of the timekeeping information and the public key data is completed.

The photographer acquires the photographic object ID comprising the one of the key data of the key pair and photographs the photographic object with the digital camera 1. The photographing operation of the digital camera 1 in the second embodiment is similar to that of the first embodiment, except that the photographing date and time information 54 is configured to be embedded in header information of the image file 52 which is then recorded on the recording media 8. In the second embodiment, the image data 49, the digest data 50 and the authentication data 51 are equivalent to the image data 23, the digest data 24 and the authentication data 25 of the first embodiment, respectively.

Next, the photographer provides the photographed image to the third person. In one embodiment, the photographed image is provided to the third person by giving the multimedia recording media 8 to the third person. In another embodiment, the photographed image is sent to the personal computer 53 of the third person through e-mail, Bluetooth, LAN (local area network), the internet or other similar devices which establishes connection between the digital camera 1 and the personal computer 53. The third person verifies that the image of the photographed person is surely the image of him/her, and that the image has not been falsified.

The third person accesses the personal computer 47 from the personal computer 53 through the communication network 55 to send the photographing date and time information 54 extracted from the image file 52 to the personal computer 47. Then, the controller 471 of the personal computer 47 searches the public key table 48, and sends the other one of the key data of the key pair (i.e. the public key) which corresponds with the photographic object ID transmitted from the wireless ID transmission device 42 at the time of the photographing date.

The computer controller 532 of the personal computer 53 creates the second digest data 57 from the authentication data 56 extracted from the image file 52 by utilizing the key data of the key pair (public key), and compares the second digest data 57 with the first digest data 58 created from the image file 52 recorded in the recording media 8 based on the hash function to create the comparison result 59.

According to the created comparison result 59, the display device of the personal computer 53 carries out display to the effect that the authentication is successful if the second digest data 57 and the first digest data 58 coincide, whereas display device of the personal computer 53 carries out display to the effect that the photographic object is unauthorized or the image is falsified if the second digest data 57 and the first digest data 58 do not coincide. Thereby, the verification of whether or not the data created from the object 41 belongs to the intended object 41 is established.

Although the example of giving the authentication to the photographed still image data has been described in the second embodiment as well, it is to be noted that the contents of data subjected to the authentication is not limited to the still image. It is possible to give the authentication to any contents of data as long as the data is created from some object. The contents of such data may be, for example but not limited to, the movie data, the sound data, etc. In this case, as in the case of giving the authentication to the still image, the authentication data may be added to the identical file as the header information or the footer information, or the authentication data may be recorded separately from the file.

In addition, although the specialized wireless ID transmission device for transmitting the photographic object ID is used in the embodiments, other transmission system such as Bluetooth and IrDA (infrared data association) may be utilized. Also, the wireless ID transmission device or the abovementioned transmission system may be incorporated in other devices such as a mobile phone, PDA (portable digital assistant) or similar devices.

Accordingly, the multimedia recording system of the present invention at least has the following advantages:

1. The authentication data of the introduced multimedia data such as the still image data, the movie data or the sound data for example is created by utilizing the object (photographic object) specifying information (ID information). Therefore, it is possible to authenticate that the introduced multimedia data has not been falsified and that the object is genuine.

2. The acquired object-specifying information is discarded every time when the predetermined amount of recording is carried out. Therefore, it is possible to prevent the object-specifying information from leakage, and as a result, it is possible to enhance a probative value that the object is genuine.

3. The acquired object-specifying information is discarded every time when the predetermined time has elapsed. Therefore, it is possible to prevent the object-specifying information from leakage, and as a result, it is possible to enhance the probative value that the object is genuine.

4. The object-specifying information configured to be either one of the key data based on the public key cryptosystem. Therefore, it is possible to verify the authentication data even when the object-specifying information is leaked, and as a result, it is possible to enhance the probative value that the object is genuine.

5. The object-specifying information is regularly updated. Therefore, it is possible to verify the authentication data even when the object-specifying information is leaked, and as a result, it is possible to enhance the probative value that the object is genuine.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A multimedia recording system which verifies whether or not a multimedia data element is created from an intended object, comprising:
   a multimedia recording apparatus configured to create the multimedia data element from the object and record the multimedia data element;
   a server apparatus configured to perform predetermined processes according to data received from a communication network; and
   a verification apparatus connected with the server apparatus through the communication network,
   the multimedia recording apparatus comprising
      a capture device to create the multimedia data element from the object and record the multimedia data element,
      a wireless reading device configured to acquire an object-specifying data element, which specifies the object, from a wireless transmission device of the object,
      a system controller configured to create a digest data element from the multimedia data element, create an authentication data element by encrypting the digest data element with the object-specifying data element, and embed the authentication data element in a header information of the multimedia data element, and
      a recording device configured to record the multimedia data element and the authentication data element embedded in the header information of the multimedia data element,
   the verification apparatus configured to send a first digest data element created from the multimedia data element to the server apparatus,
   the server apparatus comprising a server controller configured
      to decrypt the authentication data element embedded in the header information of the multimedia data element by using an object-specifying data element, which was previously registered on the server apparatus, as a key to create a second digest data element, to compare the second digest data element with the first digest data element of the multimedia recording apparatus, and to output a result of the comparison of the first digest data element and the second digest data element as a comparison data element, and the verification apparatus comprising a display device configured to display a result of verification of whether or not the multimedia data element created from the object belongs to the intended object based on the comparison data element, which is sent to the verification apparatus from the server apparatus.

2. The multimedia recording system according to claim 1, wherein the wireless transmission device of the object is configured to provide the object-specifying data element to the multimedia recording apparatus, and the object-specifying data element provided to the multimedia recording apparatus by the wireless transmission device and the object-specifying information previously registered on the server apparatus are the same based on a common key cryptosystem.

3. The multimedia recording system according to claim 1, wherein the multimedia data element comprises a still image data element, a movie data element, or a sound data element.

4. The multimedia recording system according to claim 1, wherein the system controller of the multimedia recording apparatus discards the acquired object-specifying data element every time when a predetermined recording to the recording device is carried out.

5. The multimedia recording system according to claim 4, wherein the system controller of the multimedia recording apparatus comprises a timer configured to measure elapse of time, and discards the acquired object-specifying data element every time when a predetermined period of time elapses according to timekeeping of the timer.

6. A multimedia recording system which verifies whether or not a multimedia data element is created from an intended object, comprising:

a multimedia recording apparatus configured to create the multimedia data element from the object and record the multimedia data element;

a server apparatus configured to perform predetermined processes according to data received from a communication network; and a verification apparatus connected with the server apparatus through the communication network, the multimedia recording apparatus comprising a capture device to create the multimedia data element from the object and record the multimedia data element, a wireless reading device configured to acquire a first of a plurality of object-specifying data elements, which specifies the object, from a wireless transmission device of the object, a system controller configured to create a digest data element from the multimedia data element, create an authentication data element by encrypting the digest data element with the first object-specifying data element and embed the authentication data element in a header information of the multimedia data element, and a recording device configured to record the multimedia data element and the authentication data element embedded in the header information of the multimedia data element, the verification apparatus configured to send a first digest data element created from the multimedia data element to the server apparatus, the server apparatus comprising a retaining device configured to retain date and time information sent from the verification apparatus through the communication network and the plurality of object-specifying data elements, and a server controller configured to search for a second of the plurality of object-specifying data elements retained in the retaining device based on the date and time information sent from the verification apparatus through the communication network and send the second object-specifying data element, which corresponds to the date and time information based on a result of search to the verification apparatus, through the communication network, and the verification apparatus comprising a verification apparatus controller configured to decrypt the authentication data element of the multimedia recording apparatus by using the second object-specifying data element, which is sent from the server apparatus through the communication network, as a key to create a second digest data element, and to compare the second digest data element with the first digest data element of the multimedia recording apparatus, and a display device configured to display a result of a verification of whether or not the multimedia data element created from the object belongs to the intended object based on a result of the comparison of the verification apparatus controller.

7. The multimedia recording system according to claim 6, wherein the wireless transmission device of the object is configured to provide the first object-specifying data element to the multimedia recording apparatus and provide the second object-specifying data element to the server apparatus, and the wireless transmission device comprises a key-pair creating unit configured to create a pair of key data based on a public key cryptosystem, and provides one of the key data to the multimedia recording apparatus as the first object-specifying data element and provides the other of the key data to the server apparatus as the second object-specifying data element.

8. The multimedia recording system according to claim 7, further comprising a system control unit configured to regularly update the key data.

9. The multimedia recording system according to claim 6, wherein the multimedia data element comprises a still image data element, a movie data element, or a sound data element.

10. The multimedia recording system according to claim 6, wherein the system controller of the multimedia recording apparatus discards the acquired first object-specifying data element every time when a predetermined recording to the recording device is carried out.

11. The multimedia recording system according to claim 10, wherein the system controller of the multimedia recording apparatus comprises a timer configured to measure elapse of time, and discards the acquired first object-specifying data element every time when a predetermined period of time elapses according to timekeeping of the timer.

* * * * *